US010678218B2

(12) United States Patent
Shimamura et al.

(10) Patent No.: US 10,678,218 B2
(45) Date of Patent: Jun. 9, 2020

(54) CONTROL DEVICE

(71) Applicant: OMRON Corporation, Kyoto (JP)

(72) Inventors: Junji Shimamura, Takatsuki (JP);
Tetsushi Jakunen, Kusatsu (JP); Eiji
Yamamoto, Kyoto (JP); Masahiko
Nakano, Ritto (JP); Masanori Ota,
Otsu (JP)

(73) Assignee: OMRON Corporation, Kyoto (JP)

( * ) Notice: Subject to any disclaimer, the term of this
patent is extended or adjusted under 35
U.S.C. 154(b) by 177 days.

(21) Appl. No.: 15/894,951

(22) Filed: Feb. 13, 2018

(65) Prior Publication Data
US 2019/0049925 A1 Feb. 14, 2019

(30) Foreign Application Priority Data

Aug. 10, 2017 (JP) ................. 2017-155781

(51) Int. Cl.
G06F 9/44 (2018.01)
G05B 19/414 (2006.01)
(52) U.S. Cl.
CPC ........... G05B 19/4145 (2013.01); G05B
2219/31418 (2013.01); G05B 2219/34288
(2013.01)
(58) Field of Classification Search
CPC ........ G06F 8/433; G06F 8/4441; G06F 8/441;
G06F 8/443; G06F 8/445
USPC ........................................ 717/152
See application file for complete search history.

(56) References Cited

U.S. PATENT DOCUMENTS

2002/0184479 A1* 12/2002 Sexton ............... G06F 9/30058
712/236
2011/0184535 A1 7/2011 Fischer et al.

FOREIGN PATENT DOCUMENTS

| EP | 2515189 | 10/2012 |
| EP | 2887165 | 6/2015 |
| EP | 3076293 | 10/2016 |
| JP | 2012-194662 | 10/2012 |
| JP | 2013-134786 | 7/2013 |

OTHER PUBLICATIONS

"Search Report of Europe Counterpart Application", dated Sep. 19, 2018, p. 1-7.

* cited by examiner

Primary Examiner — Chuck O Kendall
(74) Attorney, Agent, or Firm — JCIPRNET

(57) ABSTRACT

The present disclosure meets demand to realize control computations according to programs having different execution formats by a single control device. The control device includes a storage unit storing a first program to be scanned as a whole for each execution and a second program that is sequentially executed, an execution processing unit computing a first command value by executing the first program at every predetermined control cycle, an interpreter interpreting at least a part of the second program and generating an intermediate code, a command value computation unit computing a second command value at every control cycle according to the intermediate code generated in advance by the interpreter, and an output unit outputting the first command value computed by the execution processing unit and the second command value computed by the command value computation unit at every control cycle.

20 Claims, 12 Drawing Sheets

CONTROL DEVICE

CROSS-REFERENCE TO RELATED APPLICATION

This application claims the priority benefit of Japanese Patent Application Laid-Open (JP-A) no. 2017-155781, filed on Aug. 10, 2017. The entirety of each of the above-mentioned patent applications is hereby incorporated by reference herein and made a part of this specification.

BACKGROUND

Technical Field

The present disclosure relates to a control device for controlling a control object.

Description of Related Art

In various production sites, factory automation (FA) technology using a control device such as a programmable logic controller (PLC) is widely used. Such a control device not only directly controls a control object but also indirectly controls a control object by giving a control command to another device in some cases. For example, in Japanese Patent Application Publication No. 2013-134786 (Patent Literature 1), a system including a machine tool and a PLC connected to the machine tool is disclosed.

Meanwhile, with the advance of information and communication technology (ICT) in recent years, a processing capability of a control device has dramatically improved. There is also demand to integrate a control system realized by using a plurality of dedicated devices into a smaller number of control devices in the related art. For example, in Japanese Patent Application Publication No. 2012-194662 (Patent Literature 2), a configuration in which a motion computation program and a user program are executed in synchronization with each other in a central processing unit (CPU) of a PLC is disclosed. According to the configuration disclosed in Japanese Patent Application Publication No. 2012-194662 (Patent Literature 2), a user program such as a sequence program and a motion computation program may be executed in association/synchronization with each other.

SUMMARY

According to an embodiment of the present disclosure, a control device for controlling a control object is provided. The control device includes a storage unit configured to store a first program to be scanned as a whole for each execution and a second program that is sequentially executed, an execution processing unit configured to compute a first command value by executing the first program at every predetermined control cycle, an interpreter configured to interpret at least a part of the second program and generate an intermediate code, a command value computation unit configured to compute a second command value at every control cycle according to the intermediate code generated in advance by the interpreter, and an output unit configured to output the first command value computed by the execution processing unit and the second command value computed by the command value computation unit at every control cycle.

DESCRIPTION OF THE EMBODIMENTS

Figure 1:
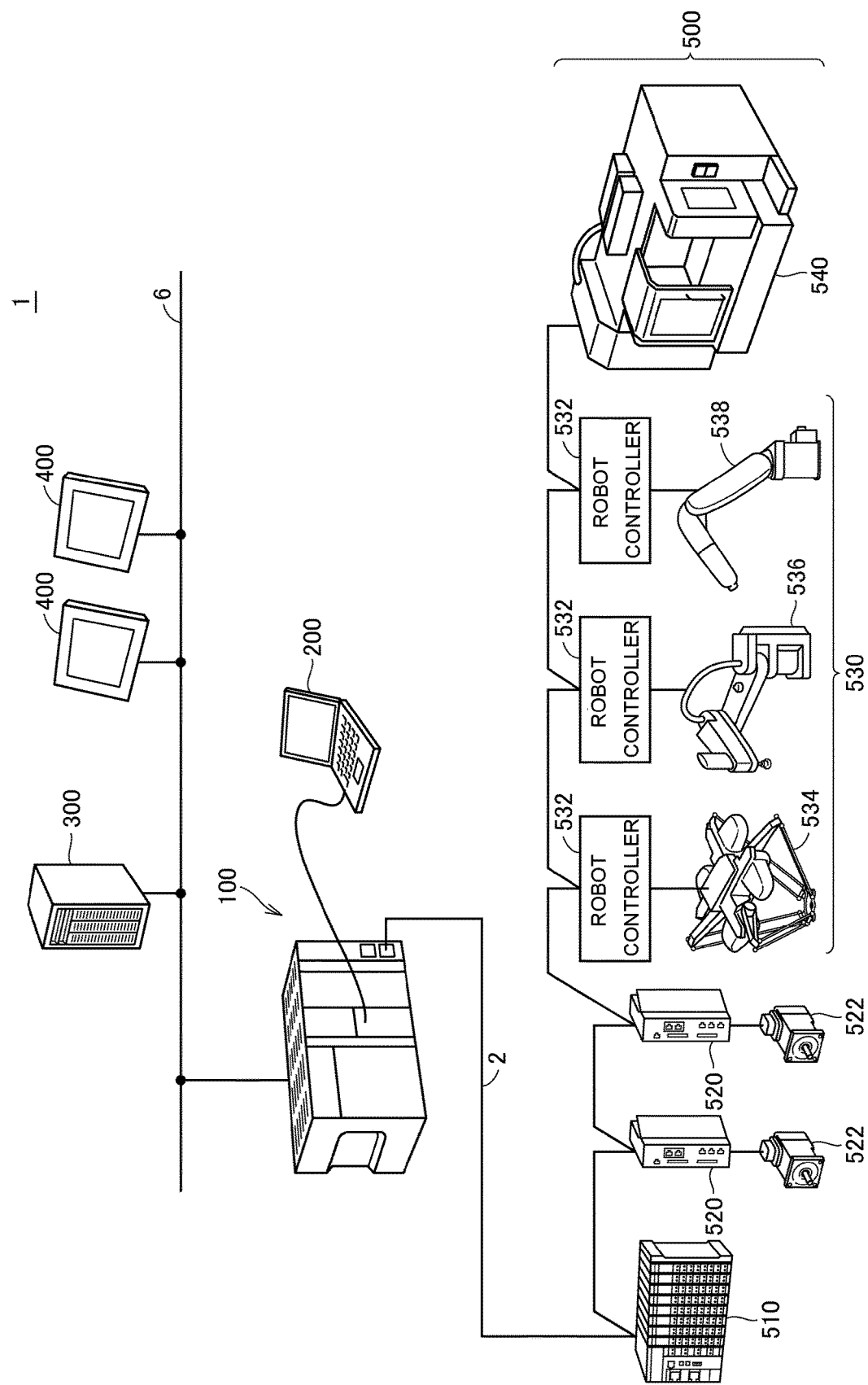
FIG. 1 is a schematic diagram illustrating an overall configuration example of a control system according to the present embodiment.

An embodiment of the present disclosure will be described in detail with reference to the drawings. Like or corresponding parts in the drawings are denoted by like reference numerals, and description thereof will not be repeated.

It is assumed that demand to realize the control computations according to a plurality of types of programs having different execution formats by a single control device is increased. An object of one or some exemplary embodiments of the present disclosure is to provide a control device capable of meeting such demand.

According to an aspect of the present disclosure, a control device for controlling a control object is provided. The control device includes a storage unit configured to store a first program to be scanned as a whole for each execution and a second program that is sequentially executed, an execution processing unit configured to compute a first command value by executing the first program at every predetermined control cycle, an interpreter configured to interpret at least a part of the second program and generate an intermediate code, a command value computation unit configured to compute a second command value at every control cycle according to the intermediate code generated in advance by the interpreter, and an output unit configured to output the first command value computed by the execution processing unit and the second command value computed by the command value computation unit at every control cycle.

According to an embodiment of the disclosure, the interpreter may update data shared with the execution processing unit at every synchronization cycle, which is an integer multiple of the control cycle.

According to an embodiment of the disclosure, the interpreter may temporarily stop interpretation of the second program before the synchronization cycle comes.

According to an embodiment of the disclosure, the intermediate code may include a function for the command value computation unit to compute the second command value at every control cycle.

According to an embodiment of the disclosure, the interpreter may sequentially queue the generated intermediate code in the buffer, and the command value computation unit may read the intermediate code in an order in which the intermediate code is queued in the buffer.

According to an embodiment of the disclosure, the intermediate code may include a function that takes time of the control cycle as an input and a command value as an output.

According to an embodiment of the disclosure, the control device may include a plurality of sets of the interpreter and the command value computation unit.

According to an embodiment of the disclosure, the execution processing unit, the command value computation unit, and the output unit may be executed as high priority tasks, and the interpreter may be executed as a low priority task.

According to an embodiment of the disclosure, an execution time of the high priority task may be assigned to each control cycle, and the low priority task may be executed at a time other than the execution time of the high priority task.

According to an embodiment of the disclosure, the control device may have a processor having a plurality of cores, and the high priority task may be executed in a first core while the low priority task is executed in a second core.

According to one or some exemplary embodiments of the present disclosure, the control computations according to a plurality of types of programs having different execution formats can be realized by a single control device.

A. Terms

First, the terms used in the present specification will be described.

In the present specification, the term "IEC program" (one example of the first program) is a term encompassing a program in which the whole is scanned every time the program is executed and one or more command values are computed at every execution. Typically, the "IEC program" includes a program consisting of one or more instructions described in accordance with the International Standard IEC61131-3 defined by the International Electrotechnical Commission (IEC). The "IEC program" may include sequence control and motion control instructions. The "IEC program" is executed (scanned) as a whole at every control cycle. The "IEC program" is suitable for control that requires immediacy and high speed. The "IEC program" is not limited to the instructions described in accordance with the International Standard IEC61131-3, and may include an instruction that is independently defined by a manufacturer, a vender, or the like of a programmable logic controller (PLC).

In the present specification, "sequence control" is basically a method of sequentially executing a program (a sequence program) described by one or more logic circuits configured to compute an input value, an output value, an internal value, and the like, from the beginning to the end. In one control cycle, the program is executed from the beginning to the end, and in the subsequent control cycle, the program is executed again from the beginning to the end. The sequence program is a program expressing an electrical circuit.

In the present specification, "motion control" is a method of computing numerical values such as position, velocity, acceleration, jerk, angle, angular velocity, angular acceleration, angular jerk, and the like as commands for an actuator such as a servo motor. Even in "motion control," in one control cycle, a program (motion program) described by a function block, a numerical expression, or the like is executed from the beginning to the end. That is, a command value is computed (updated) every control cycle.

In the present specification, "control application" includes a device or a machine performing specific machining or operation and control thereof using, for example, computer numerical control (CNC) and/or a robot.

In the present specification, "application program" (one example of the second program) includes a program consisting of one or more instructions for realizing a control application, and basically includes a program which is not included in the "IEC program." The "application program" is a program expressing the procedure of the control application. For example, the application program is described using the G-language in the CNC, and is described using the robot language in the robot control. These application programs often employ an interpreter method which is sequentially executed line by line.

In the present specification, "user program (also abbreviated as "UPG")" includes a program that can be arbitrarily created by a user. The "user program" may include the sequence program for realizing the sequence control, the motion program for realizing the motion control, and the application program.

B. Overall Configuration Example of Control System

First, an overall configuration example of a control system 1 including a control device according to the present embodiment will be described.

FIG. 1 is a schematic diagram illustrating an overall configuration example of the control system 1 according to the present embodiment. In FIG. 1, the control system 1 focusing on a control device 100 according to the present embodiment is shown.

The control device 100 corresponds to an industrial controller that controls a control object such as various facilities and devices. The control device 100 is a type of computer that executes a control computation, which will be described below, and may typically be implemented as a PLC (programmable logic controller). The control device 100 may also be connected to various field devices 500 via a field network 2. The control device 100 transmits and receives data to and from the one or more field devices 500 via the field network 2 or the like. Generally, although "field network" is also referred to as "field bus," in the following description, the "field bus" and the "field network" will be collectively referred to as "field network" for simplicity of description. That is, the "field network" in the present specification is a concept that may include a "field bus" in addition to a "field network" in a narrow sense.

The control computation executed in the control device 100 includes a process (inputting process) of collecting data collected or generated in the field device 500 (hereinafter also referred to as "input data"), a process (computation process) of generating data such as commands for the field device 500 (hereinafter also referred to as "output data"), and a process (outputting process) of transmitting the generated output data to a target field device 500.

The field network 2 may employ a bus or network that performs fixed-period communication in which a data arrival time is guaranteed. EtherCAT (registered trademark), EtherNet/IP (registered trademark), DeviceNet (registered trademark), CompoNet (registered trademark), and the like are known as a bus or a network for performing such fixed-period communication.

An arbitrary field device 500 may be connected to the field network 2. The field device 500 includes an actuator configured to give some physical action to a manufacturing device, a production line, or the like (hereinafter also collectively referred to as "field"), and an input/output (I/O) device configured to exchange information between fields.

Although data is exchanged between the control device 100 and the field device 500 via the field network 2, the data exchanged therebetween is updated in a very short cycle of several hundred μsec to several tens of msec order. The process of updating data transmitted and received therebetween is also referred to as an I/O refresh process.

In the configuration example illustrated in FIG. 1, the field device 500 includes a remote input/output (I/O) device 510, a servo driver 520 and a servo motor 522, a robot system 530, and a CNC machining device 540. The field device 500 is not limited to the above, and an arbitrary device configured to collect input data (for example, a visual sensor or the like), an arbitrary device configured to give some action according to output data (for example, an inverter device or the like), and the like may be employed as the field device 500.

Typically, the remote I/O device 510 includes a communication coupler configured to perform communication via the field network 2, and an I/O part (hereinafter referred to as "I/O unit") configured to perform acquisition of input data and output of output data.

The remote I/O device 510 is connected to a device configured to collect input data such as an input relay and various sensors (for example, an analog sensor, a temperature sensor, a vibration sensor, and the like) and a device configured to give some action to a field such as an output relay, a contactor, a servo driver, and other arbitrary actuators.

The servo driver 520 drives the servo motor 522 according to output data (for example, a position command, a speed command, or the like) from the control device 100.

The robot system 530 includes a robot controller 532 and robot mechanisms 534, 536, and 538. The robot controller 532 calculates a trajectory, calculates an angle of each axis, etc. according to a position command or the like from the control device 100, and according to a result of calculations, drives a servo motor and the like constituting the robot mechanisms 534, 536, and 538. In the configuration example illustrated in FIG. 1, the robot mechanism 534 is a parallel robot, the robot mechanism 536 is a SCARA robot, and the robot mechanism 538 is an articulated robot. The robots are not limited to the mechanisms illustrated in FIG. 1, and any mechanism may be employed in the robots. Although a configuration in which the robot controller 532 and the robot mechanisms 534, 536, and 538 are separated is exemplified for convenience of description, embodiments are not limited thereto, and the robot controller 532 and the robot mechanisms 534, 536, and 538 may also be integrated with each other.

The CNC machining device 540 controls a machining center or the like according to a program for specifying a position, a speed, or the like, thereby machining an arbitrary object. Typically, the CNC machining device 540 includes machining devices for lathe machining, milling, electric discharge machining, and the like.

The control device 100 is also connected to other devices via a host network 6. Ethernet (registered trademark) or EtherNet/IP (registered trademark), which is a general network protocol, may be employed as the host network 6. More specifically, one or more server devices 300 and one or more display devices 400 may also be connected to the host network 6.

The server device 300 is assumed to be a database system, a manufacturing execution system (MES), or the like. The MES system acquires information from a manufacturing device or facility to be controlled, and monitors and manages the overall production, and may handle order information, quality information, shipping information, and the like. Embodiments are not limited thereto, and a device providing an information system service may also be connected to the host network 6. The information system service is assumed to be a process of acquiring information from a manufacturing device or facility to be controlled and performing a macroscopic or microscopic analysis and the like. For example, the information system service is assumed to be data mining for extracting some characteristic tendencies included in information from a manufacturing device or facility to be controlled, or a machine learning tool for performing machine learning based on information from a facility or machine to be controlled.

Upon receiving an operation from a user, the display device 400 outputs a command or the like corresponding to a user operation to the control device 100 and graphically displays a computation result or the like in the control device 100.

Further, a support device 200 can be connected to the control device 100. The support device 200 is a device that supports preparations necessary for the control device 100 to control a control object. Specifically, the support device 200 provides a development environment (a program creation editing tool, parser, compiler, and the like) of a program executed in the control device 100, a setting environment for setting the control device 100 and parameters (configurations) of various devices connected to the control device 100, a function of outputting a generated user program to the control device 100, a function of correcting/changing a user program or the like executed on the control device 100 online, and the like.

C. Hardware Configuration Example of Control Device

Next, a hardware configuration example of the control device 100 according to the present embodiment will be described.

Figure 2:
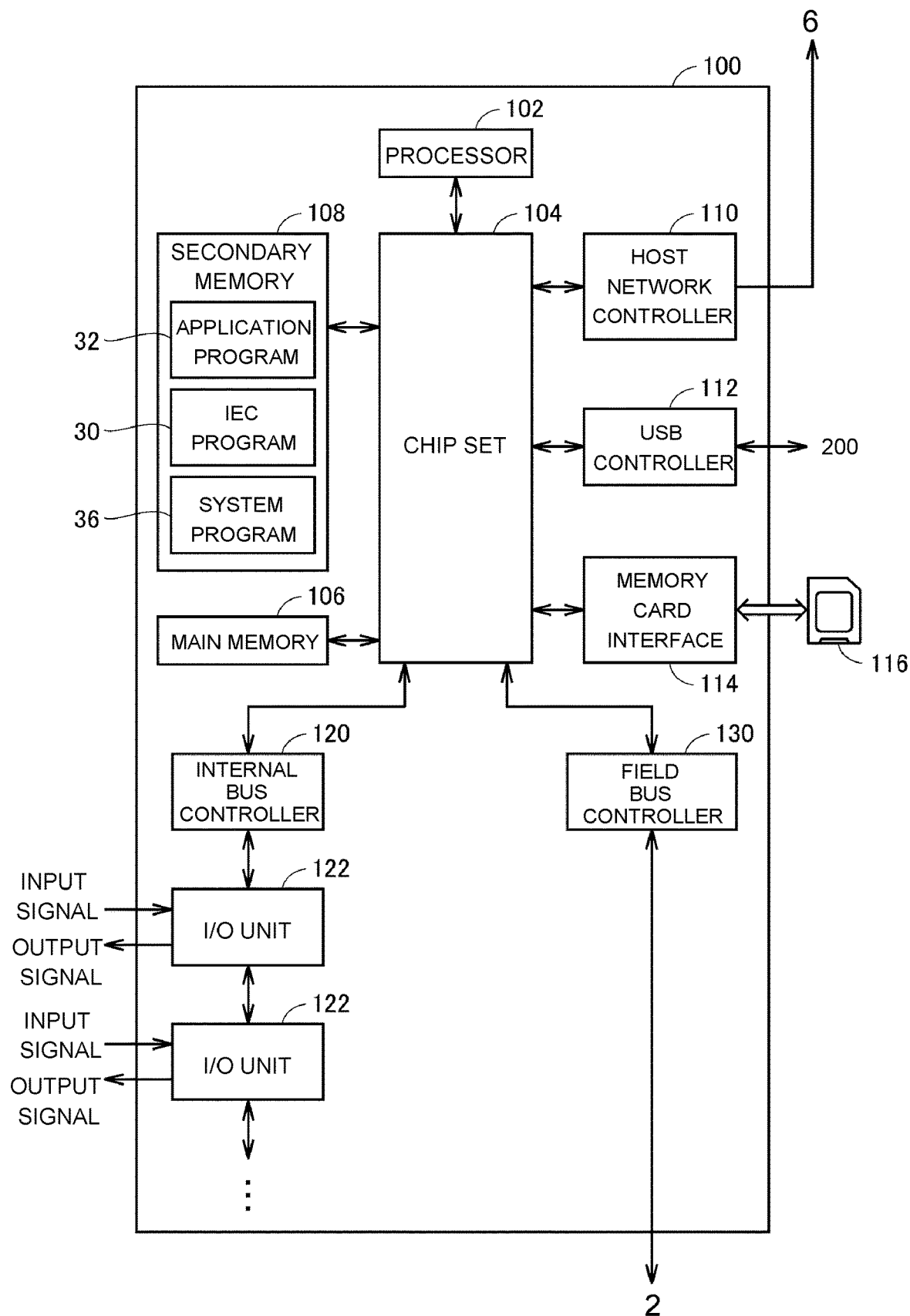
FIG. 2 is a block diagram illustrating a hardware configuration example of the control device according to the present embodiment.

FIG. 2 is a block diagram illustrating a hardware configuration example of the control device 100 according to the present embodiment. Although a general PLC is configured by a computation processing unit, which is referred to as a CPU, and one or more I/O units 122, these are collectively drawn in FIG. 2.

Referring to FIG. 2, the control device 100 includes a processor 102, a chip set 104, a main memory 106, a secondary memory 108 (one example of the storage unit), a host network controller 110, a universal serial bus (USB) controller 112, a memory card interface 114, an internal bus controller 120, and a field network controller 130.

The processor 102 is constituted by a CPU, a micro processing unit (MPU), a graphics processing unit (GPU), or the like. A configuration having a plurality of cores may be employed as the processor 102, or a plurality of processors 102 may be arranged. The chip set 104 realizes processing of the entire control device 100 by controlling the processor 102 and each device. The main memory 106 is constituted by a volatile memory such as a dynamic random access memory (DRAM) or a static random access memory (SRAM). The secondary memory 108 is, for example, constituted by a nonvolatile memory such as a hard disk drive (HDD) or a solid state drive (SSD).

The processor 102 reads various programs stored in the secondary memory 108, develops the programs in the main memory 106, and executes the programs, thereby realizing control according to a control object and various processes, which will be described below. In addition to a system program 36 for realizing basic functions, user programs (an IEC program 30 and an application program 32) created in accordance with a manufacturing device or facility to be controlled are stored in the secondary memory 108.

The host network controller 110 controls exchange of data with the server device 300, the display device 400 (see FIG. 1), or the like via the host network 6. The USB controller 112 controls exchange of data with the support device 200 via a USB connection.

The memory card interface 114 includes a memory card 116 detachably attached thereto, and can record data in the memory card 116 and read various pieces of data (user program, trace data, and the like) from the memory card 116.

The internal bus controller 120 controls exchange of data with the I/O unit 122 embedded in the control device 100. The field network controller 130 controls exchange of data with another device via the field network 2.

Although a configuration example in which necessary functions are provided by the processor 102 executing a program is illustrated in FIG. 2, some or all of the provided functions may also be implemented using a dedicated hardware circuit (for example, an application-specific integrated circuit (ASIC), a field-programmable gate array (FPGA), or the like). Alternatively, a main part of the control device 100 may be realized using hardware complying with a general-purpose architecture (for example, an industrial personal computer (PC) based on a general-purpose PC). In this case, using a virtualization technology, a plurality of operating systems (OSs) having different uses may be executed in parallel, and a necessary application may be executed on each of the OSs.

Although the control device 100, the support device 200, and the display device 400 are separately configured in the control system 1 illustrated in FIG. 1 described above, a configuration in which some or all of the functions thereof are integrated into a single device may also be employed.

D. Related Art

Next, before the configuration and functions of the control device 100 according to the present embodiment are described in detail, the related art will be described.

(d1: CNC Machining System)

Figure 3:
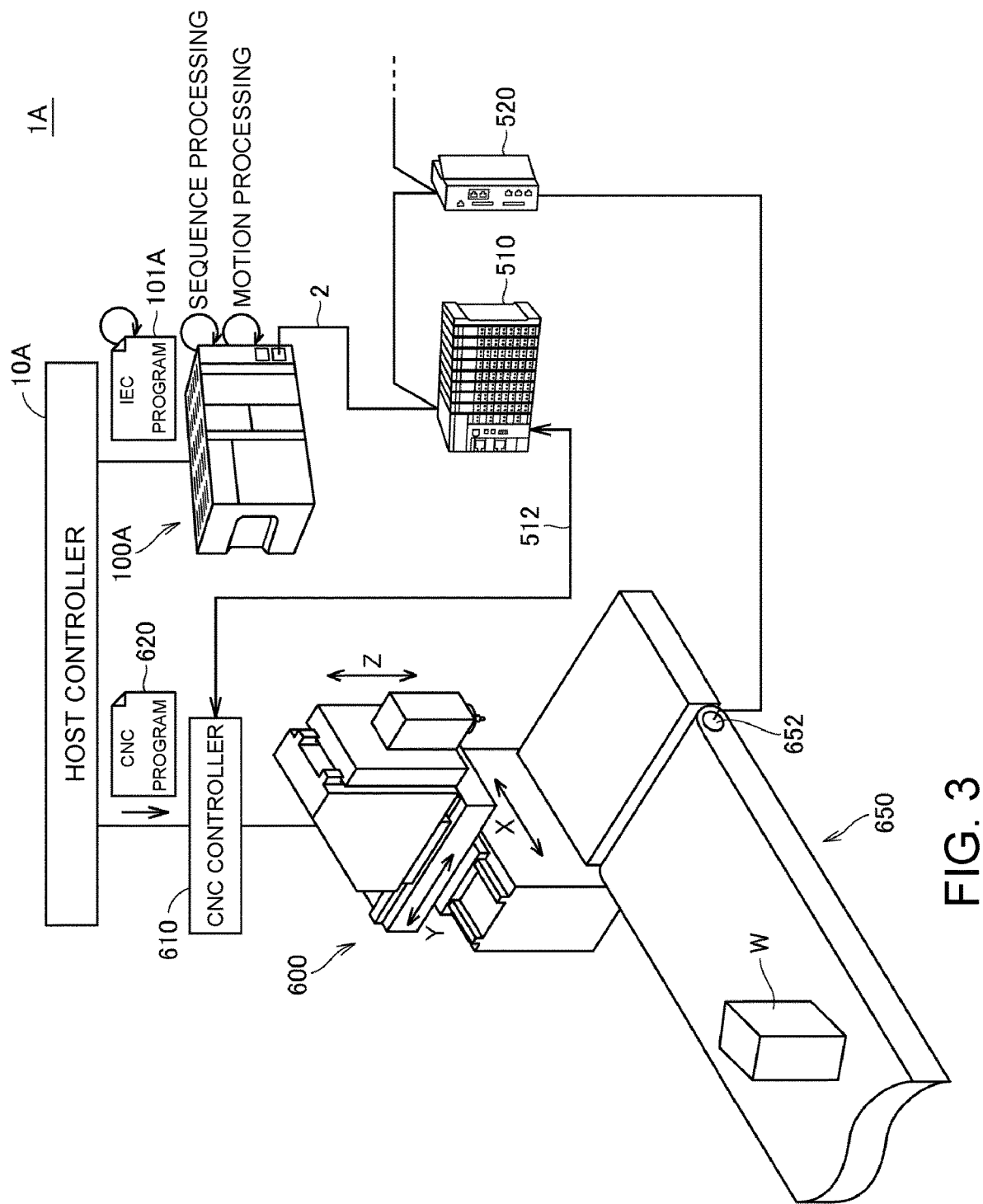
FIG. 3 is a schematic diagram illustrating an overall configuration example of a computer numerical control (CNC) machining system according to the related art of the present disclosure.

FIG. 3 is a schematic diagram illustrating an overall configuration example of a CNC machining system 1A according to the related art of the present disclosure. Referring to FIG. 3, the CNC machining system 1A includes a CNC machining device 600 and a conveying device 650 configured to supply a workpiece W to the CNC machining device 600.

The CNC machining device 600 is driven by a CNC controller 610, and the conveying device 650 is driven by a PLC 100A. Because the CNC machining device 600 and the conveying device 650 need to be linked, both the CNC controller 610 and the PLC 100A are connected to a host controller 10A. The host controller 10A gives commands to the CNC controller 610 and the PLC 100A.

The CNC controller 610 generates a command for driving the CNC machining device 600 according to a command from the host controller 10A, and controls the operation of the CNC machining device 600.

The PLC 100A periodically executes an IEC program 101A to perform control of a driving motor 652 of the conveying device 650, or the like. Typically, instructions for realizing sequence control and motion control are described in the IEC program 101A, and these instructions are repeatedly executed at a common control cycle so that the sequence control and the motion control are executed in synchronization therewith. More specifically, the PLC 100A computes output data according to the sequence control by using input data and internal data acquired through the remote I/O device 510, and outputs an output signal in accordance with the computed output data from the remote I/O device 510. By giving a command value computed in the motion control to the servo driver 520, the PLC 100A appropriately conveys the workpiece W by the conveying device 650.

A configuration in which the sequence control and the motion control are executed in the same PLC 100A is disclosed in the above-mentioned Japanese Patent Application Publication No. 2012-194662 (Patent Literature 2).

On the other hand, control over the CNC machining device 600 is realized by the CNC controller 610 separately disposed from the PLC 100A. The CNC controller 610 sequentially executes commands described in a CNC program 620 to realize predetermined machining and the like for the workpiece W.

Because the PLC 100A and the CNC controller 610 execute independent control processes, the PLC 100A and the CNC controller 610 exchange information on each device via an I/O signal (an I/O signal line 512) to operate the conveying device 650 and the CNC machining device 600 in linkage with each other. Such an I/O signal includes, for example, an operation start command or the like output from the PLC 100A. In such a configuration, a digital signal indicating the start of machining is given from the remote I/O device 510 to the CNC controller 610.

In the case of employing a configuration in which state values are exchanged between devices via such an I/O signal, for example, when a workpiece W before machining is disposed in the CNC machining device 600, or a machined workpiece W is withdrawn from the CNC machining device 600, the CNC machining device 600 and the conveying device 650 cannot be perfectly synchronized. Therefore, because a control timing is not synchronized between the CNC machining device 600 and the conveying device 650 (or still another device), waiting for processing occurs. Such waiting for processing is a factor that impedes shortening of processing time.

An execution timing of each program in the system according to the related art of the present disclosure will be described.

Figure 4:
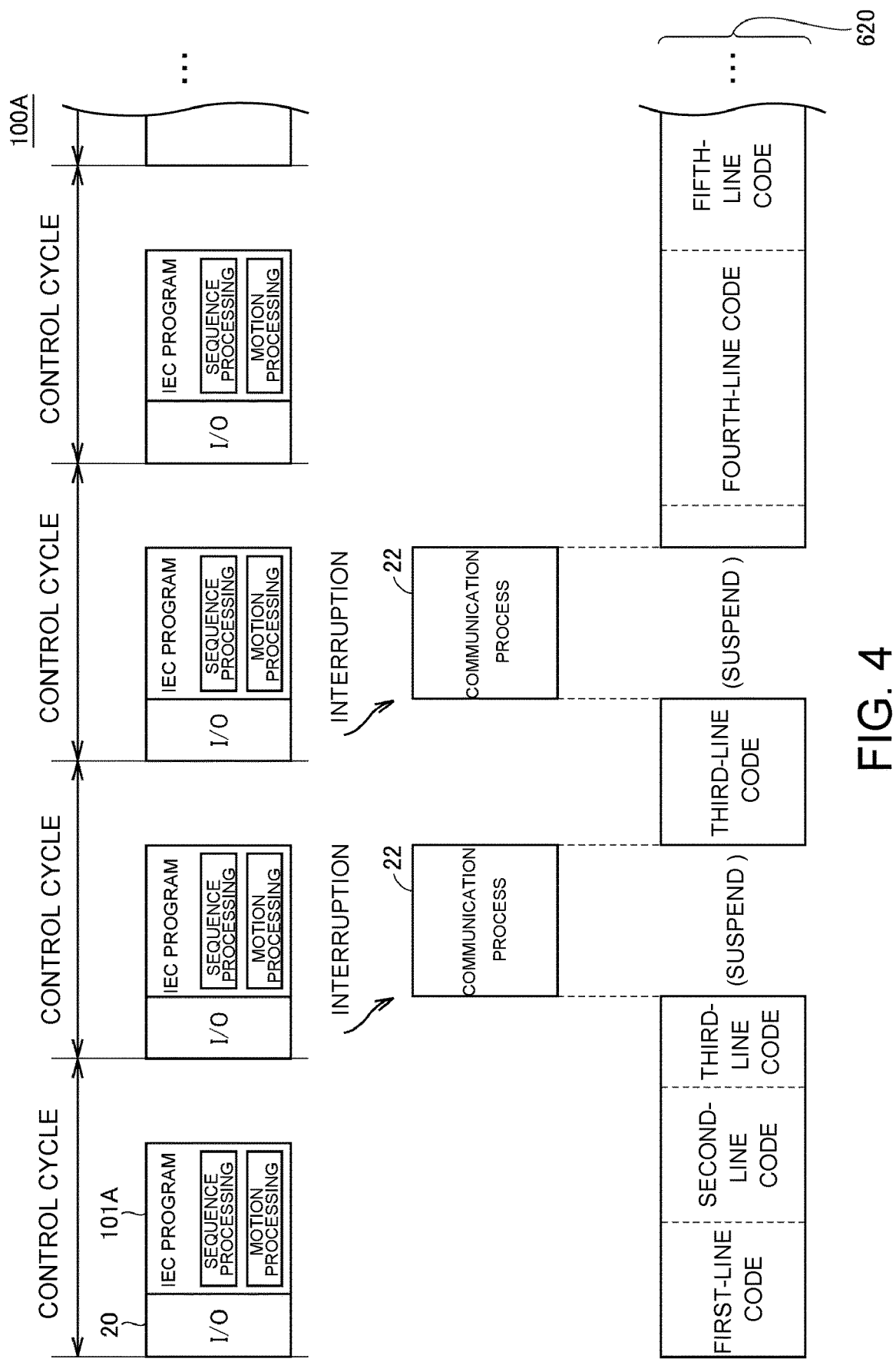
FIG. 4 is a schematic diagram illustrating an example of an execution timing of a program in the CNC machining system according to the related art of the present disclosure illustrated in FIG. 3.

FIG. 4 is a schematic diagram illustrating an example of execution timing of a program in the CNC machining system 1A according to the related art of the present disclosure shown in FIG. 3. For convenience of description, in FIG. 4, the execution time of each program is drawn by scaling to an arbitrary size and does not reflect the actual execution time. This also applies to the following similar drawings.

The part A of FIG. 4 shows a state in which the IEC program 101A is periodically executed by the PLC 100A, and the part B of FIG. 4 shows a state in which the CNC program 620 is sequentially executed by the CNC controller 610.

As illustrated in the part A of FIG. 4, in the PLC 100A, the IEC program 101A is periodically executed at every control cycle of a predetermined length. The IEC program 101A may include instructions for sequence processing and/or motion processing. These instructions may be described in the same program.

Prior to the execution of the IEC program 101A, an I/O refresh process 20 (also referred to as "I/O" in the drawings) for updating input data and output data is executed. In the I/O refresh process 20, input data is acquired from a field via the remote I/O device 510 or the like, and output data computed by the IEC program 101A in the immediately preceding control cycle is given to the field via the remote I/O device 510 or the like.

In this way, the entire content (codes) of the IEC program 101A is scanned at every control cycle. In each control cycle, processing such as communication is executed during an in-between period in which the IEC program 101A is not executed.

As illustrated in the part B of FIG. 4, commands described in the CNC program 620 are sequentially executed. That is, the CNC program 620 is executed by an interpreter method. More specifically, first, a first-line code of the CNC program 620 is executed, and after the execution thereof is completed, a second-line code is executed continuously. In this way, the codes described in the CNC program 620 are sequentially executed.

An interruption is given during the execution of the CNC program 620 so that a communication process 22 is executed.

Because properties of the IEC program 101A executed by the PLC 100A and the CNC program 620 executed by the CNC controller 610 are different, as can be recognized when the part A of FIG. 4 and the part B of FIG. 4 are compared, different control devices for respectively executing the programs are prepared in the related art.

(d2: Robot Assembly System)

Figure 5:
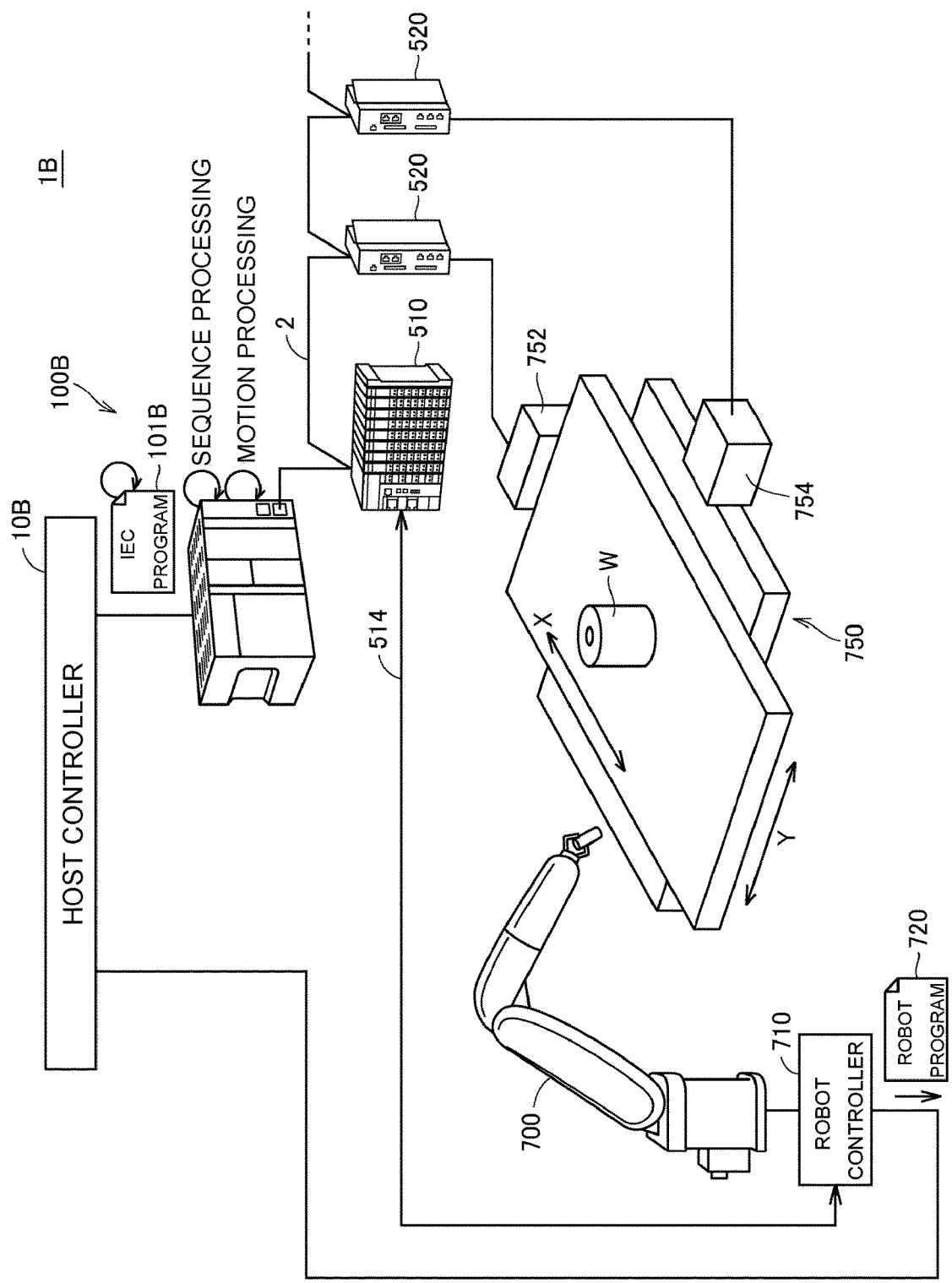
FIG. 5 is a schematic diagram illustrating an overall configuration example of a robot assembly system according to the related art of the present disclosure.

FIG. 5 is a schematic diagram illustrating an overall configuration example of a robot assembly system 1B according to the related art of the present disclosure. Referring to FIG. 5, the robot assembly system 1B includes an articulated robot 700 and an XY stage 750 configured to hold a workpiece W. FIG. 5 shows an application example in which a part gripped by a distal end of the articulated robot 700 is inserted into a hole provided in the workpiece W.

The articulated robot 700 is driven by a robot controller 710, and the XY stage 750 is driven by a PLC 100B. Because the articulated robot 700 and the XY stage 750 need to be linked, both the robot controller 710 and the PLC 100B are connected to a host controller 10B. The host controller 10B gives commands to the robot controller 710 and the PLC 100B.

The PLC 100B periodically executes an IEC program 101B to perform control of a servo motor 752 configured to drive the X-axis of the XY stage 750, a servo motor 754 configured to drive the Y-axis of the XY stage 750, and the like. Typically, instructions for realizing sequence control and motion control are described in the IEC program 101B, and these instructions are repeatedly executed at a common control cycle so that the sequence control and the motion control are executed in synchronization. More specifically, the PLC 100B computes output data according to the sequence control by using input data and internal data acquired by the remote I/O device 510, and outputs an output signal in accordance with the computed output data from the remote I/O device 510. By giving a command value computed in the motion control to each servo driver 520, the PLC 100B locates the workpiece W disposed on the XY stage 750 at an appropriate position.

On the other hand, control over the articulated robot 700 is realized by the robot controller 710 separately disposed from the PLC 100B. The robot controller 710 sequentially executes commands described in a robot program 720 so that the articulated robot 700 performs a predetermined behavior.

Because the PLC 100B and the robot controller 710 execute independent control processes, the PLC 100B and the robot controller 710 exchange information on each device via an I/O signal (an I/O signal line 514) to operate the XY stage 750 and the articulated robot 700 in linkage with each other. Such an I/O signal includes, for example, an operation start command or the like output from the PLC 100B. In such a configuration, a digital signal indicating the start of machining is given from the remote I/O device 510 to the robot controller 710.

In the case of employing a configuration in which state values are exchanged between devices via such an I/O signal, for example, when a workpiece W before machining is disposed at a predetermined position, or a machined workpiece W is withdrawn, the articulated robot 700 and the XY stage 750 cannot be perfectly synchronized. Therefore, because a control timing is not synchronized between the articulated robot 700 and the XY stage 750 (or still another device), waiting for processing occurs. Such waiting for processing is a factor that impedes shortening of processing time. Further, because the operation of the XY stage 750 and the operation of the articulated robot 700 are not synchronized, when operating the articulated robot 700 while operating the XY stage 750, the operation timings do not match, and this becomes a factor that lowers assembling accuracy.

(d3: System in Which Robot Controller is Master Controller)

As disclosed in the above-described Japanese Patent Application Publication No. 2013-134786 (Patent Literature 1), a system in which a robot controller is disposed as a master controller, and the robot controller mainly controls a robot and a motor is also assumed. In this system, the robot controller gives an instruction to start operation or end operation to each of one or more robots. In this system, although a plurality of robots can be synchronized with a motor, an operation start command for the robot controller needs to be given from another controller. Therefore, it is not possible to control all elements of the system with a single robot controller.

E. Control Device According to the Present Embodiment

The control device 100 according to the present embodiment has a function capable of solving the above-described problems that occur in the related art. Specifically, the control device 100 provides an environment in which the IEC program 30 (including a sequence command and/or a motion command) and the application program 32 can be executed in synchronization with each other.

Figure 6:
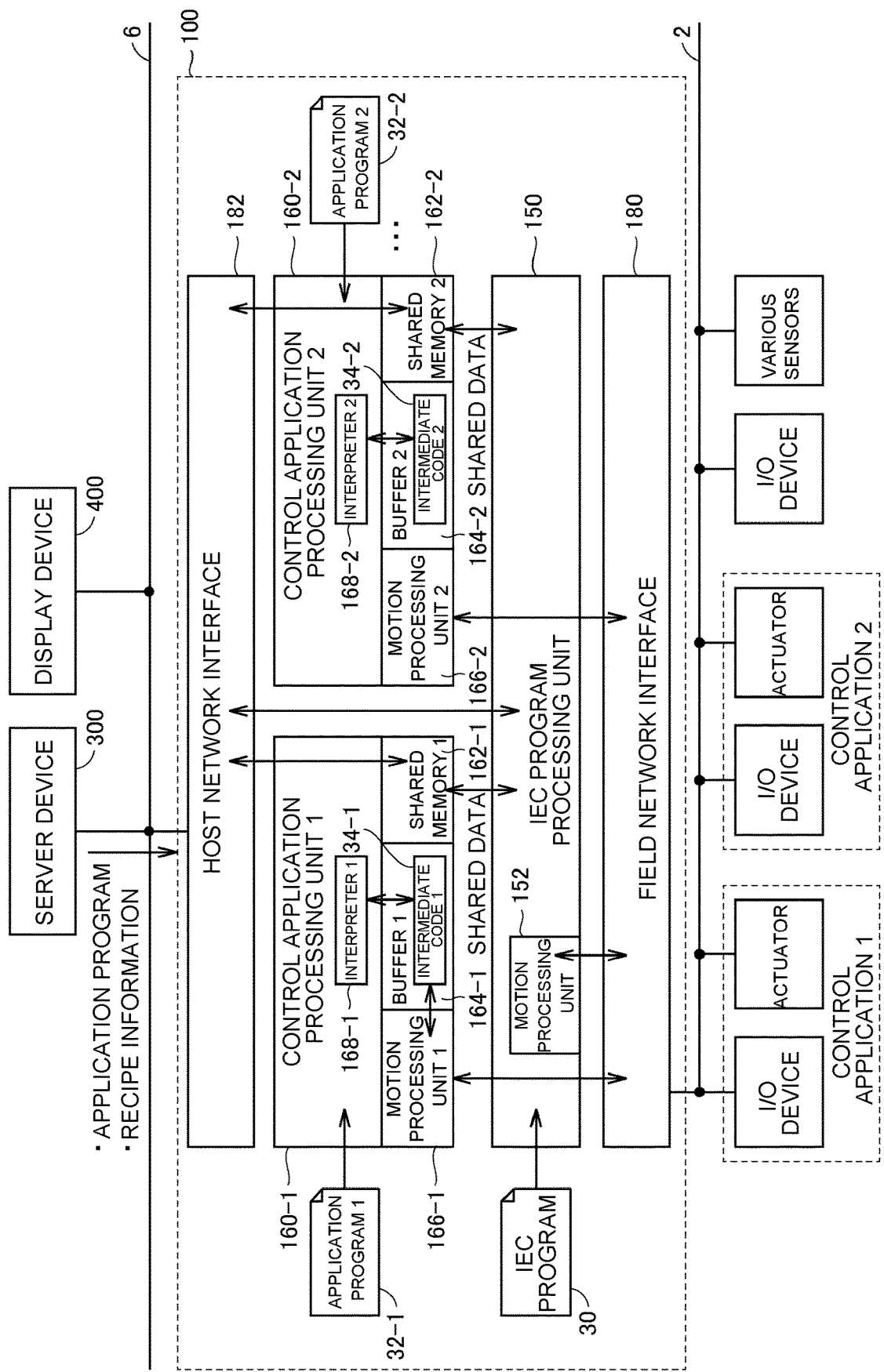
FIG. 6 is a schematic diagram illustrating an example of a functional configuration of a control device according to the present embodiment.

FIG. 6 is a schematic diagram illustrating an example of a functional configuration of the control device 100 according to the present embodiment. Referring to FIG. 6, the control device 100 includes an IEC program processing unit 150 (one example of the execution processing unit), a motion processing unit 152, a field network interface 180 (one example of the output unit), a host network interface 182, and one or more control application processing units 160-1, 160-2, . . . (hereinafter also collectively referred to "control application processing unit 160", one example of the command value computation unit).

FIG. 6 shows a configuration example in which the control device 100 controls a control application 1 and a control application 2. Typically, each of the control application 1 and the control application 2 includes an I/O device such as a relay or a contactor and various actuators such as a servo motor. In addition to the control application 1 and the control application 2, other I/O devices and various sensors are also connected to the control device 100 via the field network 2.

The field network interface 180 of the control device 100 mediates the exchange of data between the IEC program processing unit 150 and the control application processing unit 160, and the devices connected via the field network 2.

The control device 100 receives an instruction to start or end production from the server device 300 connected via the host network 6. The server device 300 transmits the application program 32 for operating the control application, recipe information (information on parameters appropriate for production), and the like to the control device 100 in some cases.

The host network interface 182 of the control device 100 mediates the exchange of data between the IEC program processing unit 150 and the control application processing unit 160, and the devices connected via the host network 6.

The IEC program processing unit 150 executes (scans) the IEC program 30 (one example of the first program) at every predetermined control cycle and computes one or more command values (one example of the first command value). That is, the IEC program processing unit 150 computes command values at every control cycle according to the IEC program 30.

The motion processing unit 152 provides a function of computing a command value at every control cycle according to a motion command included in the IEC program 30. That is, the motion command included in the IEC program 30 includes a command that instructs a behavior over a plurality of control cycles (for example, a command for drawing a certain trajectory). When such a motion command is executed, according to instruction content of the executed motion command, the motion processing unit 152 computes a command value at every control cycle. That is, the motion processing unit 152 outputs a command value at every control cycle to realize the behavior instructed by the motion command.

The control application processing unit 160 computes a command value for controlling the control application on the basis of the application program 32, the recipe information, and the like received from the server device 300 or the like. The control application processing unit 160 computes and outputs a command value for the control application, in synchronization with the IEC program processing unit 150 computing and outputting a command value. That is, the control application processing unit 160 executes a command value computing process in synchronization with the computing process by the IEC program processing unit 150.

To realize command value computation synchronized with the command value computing process by the IEC program processing unit 150, the control application processing unit 160 includes buffers 164-1, 164-2, . . . (hereinafter collectively referred to as "buffer 164"), motion processing units 166-1, 166-2, . . . (hereinafter collectively referred to as "motion processing unit 166"), and interpreters 168-1, 168-2, . . . (hereinafter collectively referred to as "interpreter 168").

The interpreter 168 interprets at least a part of the application program 32 (application programs 32-1, 32-2, . . . ) and generates an intermediate code 34 (intermediate codes 34-1, 34-2, . . . ). That is, the interpreter 168 sequentially executes the application program 32 (one example of the second program), generates the intermediate code 34, and stores the generated intermediate code 34 into a buffer 164 corresponding thereto.

The motion processing unit 166 (one example of the command value computation unit) computes a command value (one example of the second command value) at every control cycle according to the intermediate code 34 generated in advance by the interpreter 168. That is, the motion processing unit 166 provides a function of computing a command value at every control cycle according to the intermediate code 34 pre-stored in the buffer 164. Generally, because commands (codes) described in the application program 32 are sequentially executed and thus a command value computation cycle cannot be guaranteed, by using the intermediate code 34, the motion processing unit 166 may compute a command value at every control cycle. A coordinate system in accordance with each control application may be used in a command described in the intermediate code 34.

In this way, the interpreter 168 sequentially queues the generated intermediate code 34 to the buffer 164, and the motion processing unit 166 reads the intermediate code 34 in an order in which the intermediate coder 34 is queued in the buffer 164.

In the present specification, "intermediate code" is a concept including a command for computing a command value at every control cycle. The "intermediate code" includes one or more commands or one or more functions. In the present embodiment, the intermediate code 34 may be any code as long as the motion processing unit 166 can compute a command value at every control cycle. An example of the intermediate code 34 will be described below.

The field network interface 180 outputs one or more command values (basically, logical values) computed by the IEC program processing unit 150, one or more command values (basically, numerical values) computed by the motion processing unit 152, and one or more command values (basically, numerical values) computed by the motion processing unit 166 to a field at every control cycle.

To share data between the IEC program processing unit 150 and the control application processing unit 160, shared memories 162-1, 162-2, . . . (hereinafter also collectively referred to as "shared memory 162") are provided. In a configuration example illustrated in FIG. 6, some or all of the processing results by the control application processing unit 160 are stored in the shared memory 162, and the IEC program processing unit 150 may refer to data stored in the shared memory 162 of the control application processing unit 160. Data may be written from the IEC program processing unit 150 to the shared memory 162 of the control application processing unit 160, and the data recorded from the IEC program processing unit 150 as above may be referred to from the interpreter 168 and the motion processing unit 166. A structure variable may also be employed when storing data in the shared memory 162.

In this way, the control application processing unit 160 includes the application program 32, which is a user program for controlling a control application, the interpreter 168, the motion processing unit 166 for computing a command value. The application program 32 is assumed to be, for example, a program for controlling a machine tool, a program for controlling an assembly machine (robot), or the like, in accordance with a control application.

As illustrated in FIG. 6, when a plurality of control applications are controlled, flexible expansion is possible by arranging a plurality of sets of the interpreter 168 and the motion processing unit 166 in the control device 100.

F. Synchronous Execution of Program

Next, synchronous execution of a program in the control device 100 according to the present embodiment will be described.

Figure 7:
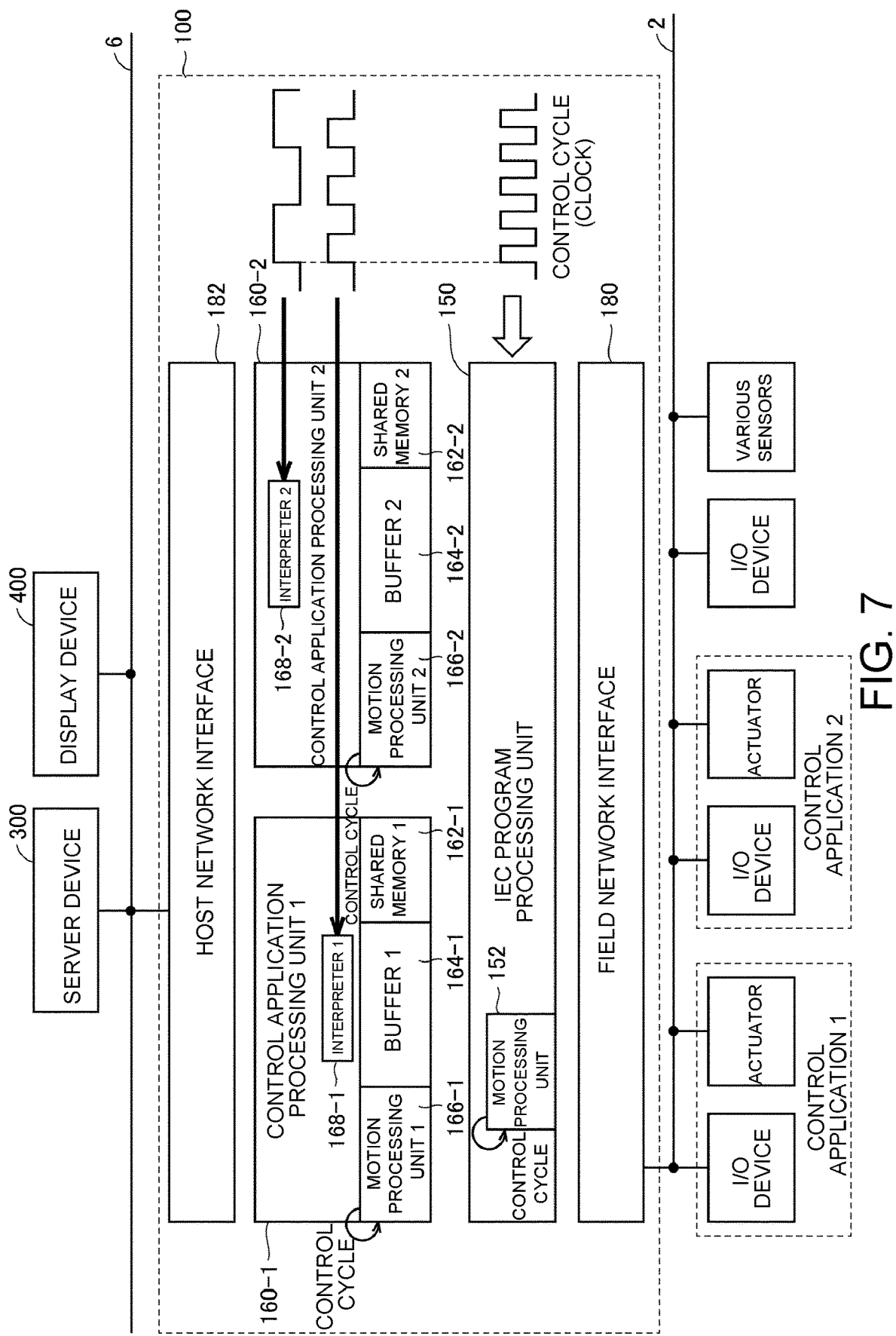
FIG. 7 is a schematic diagram illustrating an example of an execution cycle of each functional configuration in the control device according to the present embodiment.

FIG. 7 is a schematic diagram illustrating an example of an execution cycle of each functional configuration in the control device 100 according to the present embodiment. Referring to FIG. 7, the interpreter 168 of the control application processing unit 160 sequentially executes the application program 32 at every cycle longer than a control cycle. In an example illustrated in FIG. 7, the interpreter 168-1 of the control application processing unit 160-1 sequentially executes the application program 32 at every cycle that is two times longer than the control cycle, and the interpreter 168-2 of the control application processing unit 160-2 sequentially executes the application program 32 at every cycle that is four times longer than the control cycle.

Here, both the motion processing unit 152 of the IEC program processing unit 150 and the motion processing unit 166 of the control application processing unit 160 compute a command value at every identical control cycle. That is, all outputs of a command value from the control device 100 are performed in synchronization with a predetermined control cycle. In this way, the IEC program processing unit 150 and the control application processing unit 160 have respective motion processing units for continuously controlling an operation of an actuator, and by these motion processing units computing command values in synchronization with each other, both the control according to the IEC program 30 and the control according to the application program 32 may be executed in synchronization with the control cycle, and therefore, accurate control can be realized in each control cycle unit.

Figure 8:
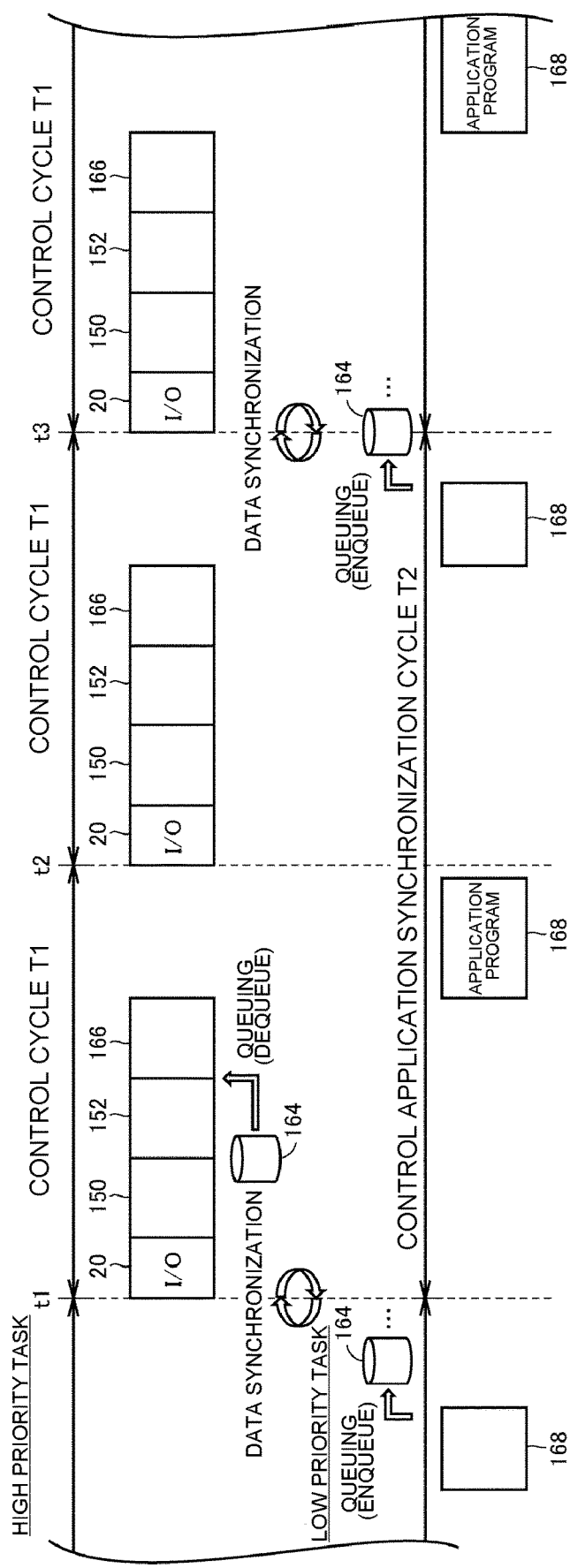
FIG. 8 is a schematic diagram illustrating an example of an execution timing of a program in the control device according to the present embodiment.

Next, execution timings of the IEC program 30 and the application program 32 in the control device 100 according to the present embodiment will be described. FIG. 8 is a schematic diagram illustrating an example of execution timings of programs in the control device 100 according to the present embodiment.

FIG. 8 shows an example in which a plurality of tasks are set for each priority, and each of the tasks shares a resource of the processor 102 according to priority thereof.

In an example illustrated in FIG. 8, executions of the field network interface 180, the IEC program processing unit 150, and the motion processing unit 166 of the control application processing unit 160 are set as high priority tasks, and execution of the interpreter 168 of the control application processing unit 160 is set as a low priority task. That is, the I/O refresh process 20, the process of executing the IEC program 30, the command value computing process in accordance with the IEC program 30, and the command value computing process in accordance with the application program 32 are executed as high priority tasks. On the other hand, the process of sequentially interpreting the application program 32 is executed as a low priority task.

The high priority tasks are repeatedly executed at every predetermined control cycle T1. The t1, t2 and t3 shown in FIG. 8 represent tune. The low priority task is executed every time during a period in which the high priority tasks are not executed. That is, in every control cycle, execution time for the high priority tasks is assigned, and the low priority task is executed during time other than the execution time for the high priority tasks.

First, the high priority tasks will be described. When each control cycle comes, first, the I/O refresh process 20 is executed, and then the entire IEC program 30 is executed (scanned) by the IEC program processing unit 150 so that one or more command values related to sequence control are computed. Further, motion processing related to a motion command included in the IEC program 30 is executed by the motion processing unit 152 such that one or more command values related to the motion command are computed. Also, an intermediate code is read (dequeued) from the buffer 164 by the motion processing unit 166 of the control application processing unit 160 such that a command value in that control cycle is computed. Hereinafter, the same process is repeated for each control cycle.

The timing (dequeuing timing) at which the motion processing unit 166 reads the intermediate code from the buffer 164 may not be each control cycle. This is because, in many cases, a read intermediate code includes commands sufficient for computing a command value over a plurality of control cycles.

When execution of the high priority tasks in a certain control cycle is completed as above, a set of a command value related to sequence control, a command value related to motion control, a command value related to a control application is prepared. These command values are basically reflected in a field when a subsequent control cycle comes. That is, because the IEC program processing unit 150 and the control application processing unit 160 compute command values according to input data at the same control cycle, the output in synchronization with the input may be realized.

On the other hand, the low priority task will be described. The interpreter 168 of the control application processing unit 160 sequentially executes the application program 32. That is, the interpreter 168 of the control application processing unit 160 executes reading and interpreting of the application program 32 with low priority. An intermediate code generated by the interpreter 168 interpreting and processing the application program 32 is sequentially queued (enqueued) to the buffer 164. The intermediate code queued in the buffer 164 is referred to by the motion processing unit 166 of the control application processing unit 160 every time and used in generating a command value.

Here, by queuing intermediate codes for an integer multiple of a control cycle, which is a computation cycle of the high priority tasks, the interpreter 168 of the control application processing unit 160 can compute a command value for a control application at every control cycle without affecting the process performed by the motion processing unit 166 of the control application processing unit 160. By interpreting and processing the application program 32 in advance, the interpreter 168 may generate a sufficient number of intermediate codes, which is referred to by the motion processing unit 166 of the control application processing unit 160 in computing a command value, in surplus.

The interpreter 168 of the control application processing unit 160 executed with low priority temporarily stops the interpreting of the application program 32 before a predetermined control application synchronization cycle (an integer multiple of the control cycle) comes. By performing data synchronization between the IEC program processing unit 150 and the control application processing unit 160 at a timing of the temporary stop, data matching in both is shared. In this way, the interpreter 168 updates data shared with the IEC program processing unit 150 at every synchronization cycle (that is, control application synchronization cycle), which is an integer multiple of a control cycle. In addition to updating the shared data, input data and output data acquired from the field may also be updated (data synchronization).

That is, the control application synchronization cycle refers to a cycle of data update or data synchronization set for sequential execution of the application program 32 performed by the interpreter 168. When it is set as an integer multiple of a control cycle, the control application synchronization cycle may have any length. The length is appropriately set according to the accuracy of control required in the control application.

Figure 9:
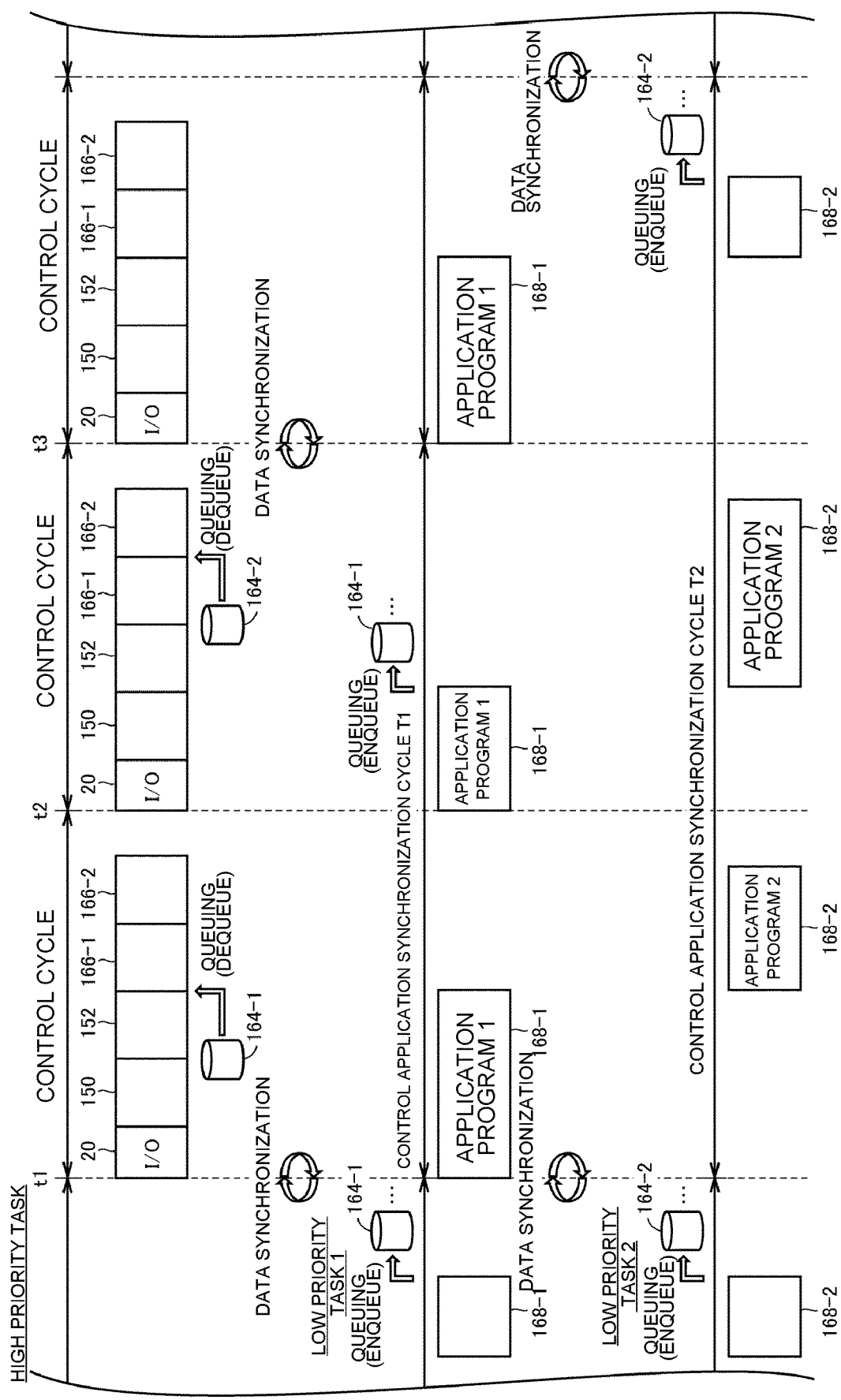
FIG. 9 is a schematic diagram illustrating another example of an execution timing of a program in the control device according to the present embodiment.

FIG. 9 is a schematic diagram illustrating another example of an execution timing of a program in the control device 100 according to the present embodiment. FIG. 9 shows an example of execution timing when a plurality of control applications are controlled. Also, FIG. 9 shows an example in which a high priority task and a low priority task are executed in different cores. In the example illustrated in FIG. 9, the high priority task and the low priority task are executed in parallel.

As in FIG. 8 described above, the high priority tasks are repeatedly executed at every predetermined control cycle T1. More specifically, when each control cycle comes, first, the I/O refresh process 20 is executed, and then the entire IEC program 30 is executed (scanned) by the IEC program processing unit 150 such that one or more command values related to sequence control are computed. Further, motion processing related to a motion command included in the IEC program 30 is executed by the motion processing unit 152 such that one or more command values related to the motion command are computed. Also, an intermediate code is read (dequeued) from the buffer 164-1 by the motion processing unit 166-1 of the control application processing unit 160-1 such that a command value in that control cycle is computed. Then, an intermediate code is read (dequeued) from the buffer 164-2 by the motion processing unit 166-2 of the control application processing unit 160-2 such that a command value in that control cycle is computed.

On the other hand, both the application program 32-1 and the application program 32-2 are executed as the same low priority task. In the example illustrated in FIG. 9, a control application synchronization cycle 1 of the application program 32-1 is set as two times a control cycle, and a control application synchronization cycle 2 of the application program 32-2 is set as three times the control cycle.

The interpreter 168-1 of the control application processing unit 160-1 and the interpreter 168-2 of the control application processing unit 160-2 sequentially execute the application program 32 in accordance with adjustment from a scheduler (not illustrated) or the like.

More specifically, the interpreter 168-1 of the control application processing unit 160-1 sequentially queues (enqueues) an intermediate code generated by interpreting and processing the application program 32-1 to the buffer 164-1. The interpreter 168-1 of the control application processing unit 160-1 temporarily stops the process at every predetermined control application synchronization cycle (an integer multiple of the control cycle). At a timing of the temporary stop, data synchronization is performed between the IEC program processing unit 150 and the control application processing unit 160-1, so that data matching in both is shared.

The interpreter 168-2 of the control application processing unit 160-2 sequentially queues (enqueues) an intermediate code generated by interpreting and processing the application program 32-2 to the buffer 164-2. The interpreter 168-2 of the control application processing unit 160-2 temporarily stops the process at every predetermined control application synchronization cycle (an integer multiple of the control cycle). At a timing of the temporary stop, data synchronization is performed between the IEC program processing unit 150 and the control application processing unit 160-2, so that data matching in both is shared.

Although the control application synchronization cycle 1 of the application program 32-1 and the control application synchronization cycle 2 of the application program 32-2 are different, because both thereof are integer multiples of the control cycle, each of the control application synchronization cycles may synchronize a process thereof with the IEC program processing unit 150 on the basis of the control cycle.

When the control device 100 having the processor 102 having a plurality of cores is employed, a high priority task may be executed in a certain core, and a low priority task may be executed in another core.

As described above, when a plurality of application programs 32 are executed to control a plurality of control applications, the application programs 32 may be executed in parallel with the same priority. In the present embodiment, because a method in which execution of the application program 32 is temporarily stopped at every control application synchronization cycle, and the intermediate code 34 is queued for each control cycle unit is employed, limitations on mounting is small.

That is, any method may be employed as a method of assigning a resource of the processor 102 required for executing the plurality of application programs 32. For example, the method may be a round robin execution method in which a common processor (or core) is shared by time-sharing, or an individual core assigning method in which a unique core is assigned to each of the application programs 32. A method in which a common processor (or core) with a high priority task is shared by time-sharing may also be employed.

Although an example in which a process is executed in the order of the IEC program processing unit 150, the motion processing unit 152, and the motion processing unit 166 is illustrated in FIGS. 8 and 9, embodiments are not limited thereto, and the process may be executed in any order as long as each of the members may complete execution of the process within the same control cycle.

G. Intermediate Code

Next, an example of the intermediate code generated by the interpreter 168 of the control application processing unit 160 interpreting the application program 32 will be described.

Figure 10:
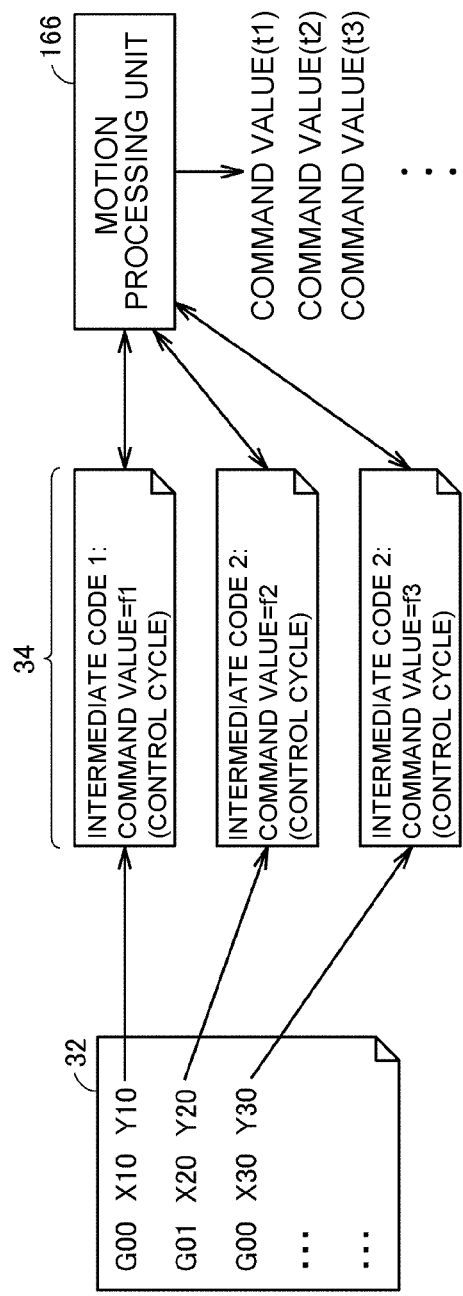
FIG. 10 is a schematic diagram conceptually illustrating an intermediate code generated in the control device according to the present embodiment.

FIG. 10 is a schematic diagram conceptually illustrating an intermediate code generated in the control device 100 according to the present embodiment. Referring to FIG. 10, the application program 32 includes codes that are sequentially executed by an interpreter method, and time required when each of the codes is sequentially executed varies according to content described by each of the codes. Therefore, computing a command value at every control cycle is not easy. FIG. 10 also illustrates, as an example of the application program 32, a code described with the G-language to be used in CNC.

Accordingly, in the present embodiment, one or more codes described in the application program 32 are interpreted, and on the basis of the interpreted content, the intermediate code 34 for computing a command value is generated at every control cycle. Because the intermediate code 34 is generated for each of one or more codes described in the application program 32, a plurality of intermediate codes 34 are generated from a single application program 32 in many cases.

In each of the intermediate codes 34, a function capable of computing a command value may be specified with time (or duration) of a control cycle as an input. That is, the intermediate code 34 may be a function for the motion processing unit 166 of the control application processing unit 160 to compute a command value at every control cycle. By using such a function, the motion processing unit 166 may compute a command value in each control cycle by sequentially referring to the generated intermediate code 34.

For example, when a first intermediate code 1 specifies a command value over a period that is ten times longer than a control cycle, the motion processing unit 166 of the control application processing unit 160 queues the intermediate code 1 and periodically computes a command value over the period that is ten times longer than the control cycle. Likewise, an intermediate code 2 and an intermediate code 3, which are different from the intermediate code 1, may also be basically used to compute a command value over a plurality of control cycles.

Accordingly, when the process of generating an intermediate code from the application program 32 by the interpreter 168 of the control application processing unit 160 is executed sufficiently earlier in comparison to the process of computing a command value by the motion processing unit 166 of the control application processing unit 160, the control application may be controlled in synchronization with the execution of the IEC program 30.

Figure 11:
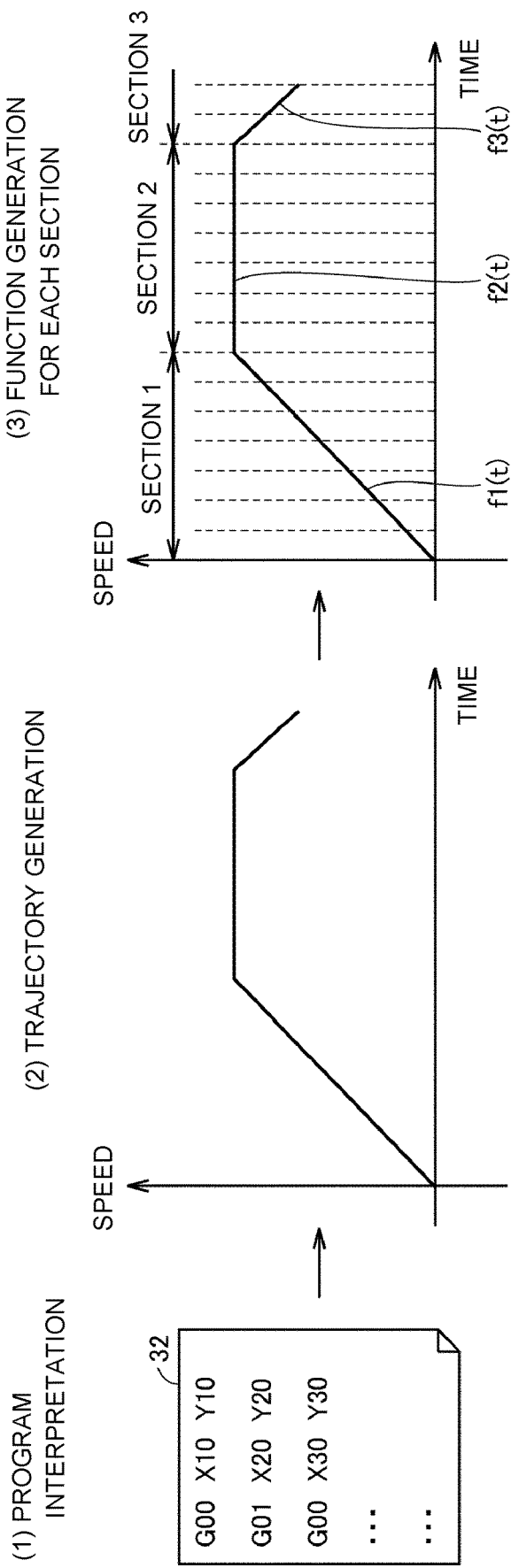
FIG. 11 is a schematic diagram for describing an example of generation of the intermediate code in the control device according to the present embodiment.

FIG. 11 is a schematic diagram for describing an example of generation of the intermediate code in the control device 100 according to the present embodiment. Referring to FIG. 11, for example, when the application program 32 for specifying a trajectory along which an operation needs to be performed is sequentially executed, first, the application program 32 is interpreted ((1) program interpretation), and a specified trajectory is internally generated ((2) trajectory generation). After the relationship between the trajectory and a position for each control cycle is determined, one or more functions indicating the internally generated trajectory are generated ((3) generation of function for each section).

In this way, as an example of the intermediate code 34, a function that takes time of a control cycle as an input and a command value as an output may be used.

In an example illustrated in FIG. 11, because the internally generated trajectory is a combination of straight lines, functions $f1(t)$, $f2(t)$, and $f3(t)$ that indicate the relationship between time and speed at a trajectory of each straight line section (section 1 to section 3) are output.

The functions $f1(t)$, $f2(t)$, and $f3(t)$ output as above correspond to examples of the intermediate code 34 in the present embodiment. A single function that specifies the trajectory illustrated in FIG. 11 may be output as an intermediate code. The intermediate code 34 to be output may be appropriately designed in consideration of a required time-width or the like of a control cycle.

Although the application program using the G-language has been described above as an example with reference to FIGS. 10 and 11, embodiments are not limited thereto, and any language may be used as long as the program is executed by an interpreter method such as an arbitrary robot language. An arbitrary function may be output as the intermediate code 34 according to the language.

H. Processing Procedure

Next, a processing procedure in the control device 100 according to the present embodiment will be described.

Figure 12:
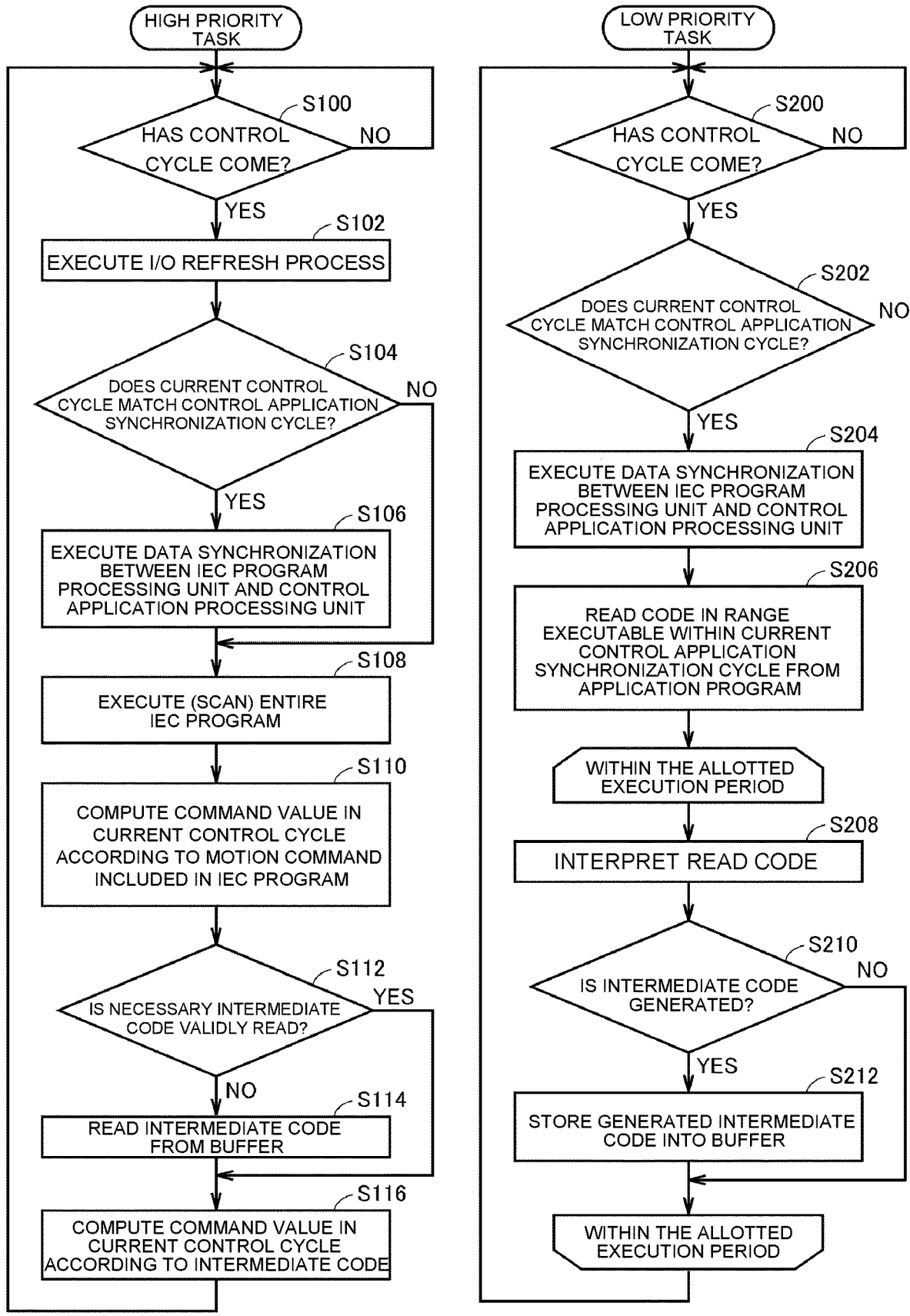
FIG. 12 is a flowchart illustrating a processing procedure in the control device according to the present embodiment.

FIG. 12 is a flowchart illustrating a processing procedure in the control device 100 according to the present embodiment. FIG. 12 separately shows executions of a high priority task and a low priority task.

Referring to FIG. 12, in regard of a high priority task, when a control cycle comes (YES in Step S100), the field network interface 180 executes the I/O refresh process (Step S102). Therefore, a command value computed in the immediately preceding control cycle is output to an actuator or the like, and input data is acquired from a field.

Then, whether the current control cycle matches a control application synchronization cycle is determined (Step S104). When the current control cycle matches the control application synchronization cycle (YES in Step S104), data synchronization is executed between the IEC program processing unit 150 and the control application processing unit 160 (Step S106). When the current control cycle does not match the control application synchronization cycle (NO in Step S104), the process of Step S106 is skipped.

Then, the IEC program processing unit 150 executes (scans) the entire IEC program 30 (Step S108). Then, the motion processing unit 152 computes a command value in the current control cycle according to a motion command included in the IEC program 30 (Step S110). By Steps S108 and S110, a command value for sequence processing and motion processing according to the IEC program 30 in the current control cycle is computed.

The motion processing unit 166 of the control application processing unit 160 determines whether an intermediate code required for computing a command value is validly read (Step S112). When the intermediate code is not validly read (NO in Step S112), the motion processing unit 166 reads the intermediate code from the buffer 164 (Step S114). When the intermediate code is validly read (YES in Step S112), the process of Step S114 is skipped.

The motion processing unit 166 of the control application processing unit 160 computes a command value in the current control cycle according the intermediate code (Step S116).

By the above process, a command value in the current control cycle is computed. Then, the process following Step S100 is repeated. That is, when the next control cycle comes, the computed command value is output to a field. A low priority task is executed in a period after Step S116 until the next control cycle comes.

In regard of a low priority task, when a control cycle comes (YES in Step S200), whether the current control cycle matches a control application synchronization cycle is determined (Step S202). When the current control cycle matches the control application synchronization cycle (YES in Step S202), data synchronization is executed between the IEC program processing unit 150 and the control application processing unit 160 (Step S204). Then, the interpreter 168 of the control application processing unit 160 reads, from the application program 32, a code in the range that is executable within the current control application synchronization cycle (Step S206). As an example, a correspondence relationship for calculating a control cycle required for execution on the basis of each command and designated parameters and the like may be implemented in advance in the interpreter 168, and by referring to the correspondence relationship, the range to which a code will be read may be determined.

When the current control cycle does not match the control application synchronization cycle (NO in Step S202), the processes of Step S204 and S206 are skipped.

During a period in which execution time of a program is assigned for a low priority task, the interpreter 168 of the control application processing unit 160 interprets the code read in Step S206 (Step S208), and when a certain intermediate code is generated (YES in Step S210), the generated intermediate code is stored in the buffer 164 (Step S212). Then, the process following Step S200 is repeated.

That is, within the control application synchronization cycle, the processes from Steps S208 to S212 are repeated in a period in which execution time of a program is assigned for a low priority task.

Although an example in which a single control application is controlled is illustrated in FIG. 12, it is self-evident that similar expansion is possible even when a plurality of control applications are controlled.

The control device 100 according to the present embodiment has function of scheduling when a plurality of types of programs having different execution formats are executed. The IEC program processing unit 150 updates a command value to a field and a feedback value from the field (output data and input data) according to the IEC program 30 at every control cycle. In addition to the fixed-period execution of the IEC program 30, the control device 100 includes the control application processing unit 160 for computing a command value at every control cycle according to an application program for controlling a control application having specific purposes such as machining/assembling/inspection realized by a machining tool or robot.

To execute application programs 32 having different execution formats and control cycles with a common processor by the IEC program 30, the control application processing unit 160 executes a process of computing a command value in a control application in synchronization with a control cycle, and sequential executions such as interpreting the application program 32 are separately executed from the process of computing a command value.

To maintain data synchronization between the IEC program 30 and the application program 32, the control application processing unit 160 executes synchronization process of shared data at every control application synchronization cycle (an integer multiple of a control cycle). That is, at a timing at which the control cycle of the IEC program processing unit 150 and a clock of the control application are synchronized, data may be updated while matching therebetween is maintained.

By employing the control device 100 according to the present embodiment, a control computation in accordance with an IEC program and a control computation in accordance with one or more control applications such as machining/assembling/inspection being realized by a machine tool, a robot, or the like may be realized with the common control device 100. Therefore, an I/O device and an actuator (motor or the like) connected to the control device 100, and one or more control applications may be controlled in synchronization with each other.

By employing the control device 100 according to the present embodiment, delay time or the like that is generated due to waiting between a plurality of devices can be reduced, and thus productivity can be improved.

By employing the control device 100 according to the present embodiment, because a dedicated controller disposed for each control application can be omitted, the cost required for system configuration can be reduced.

By employing the control device 100 according to the present embodiment, because wiring (I/O signal line) between controllers can be realized by software, time and cost required for design and implementation can be reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control device for controlling a control object, the control device comprising:
   a storage unit storing a first program to be scanned as a whole for each execution and a second program that is sequentially executed;
   an execution processing unit computing a first command value by executing the first program at every predetermined control cycle;
   an interpreter interpreting at least a part of the second program and generating an intermediate code;
   a command value computation unit computing a second command value at every control cycle according to the intermediate code generated in advance by the interpreter; and
   an output unit outputting the first command value computed by the execution processing unit and the second command value computed by the command value computation unit at every control cycle.

2. The control device according to claim 1, wherein the interpreter updates data shared with the execution processing unit at every synchronization cycle, which is an integer multiple of the control cycle.

3. The control device according to claim 2, wherein the interpreter temporarily stops interpretation of the second program before the synchronization cycle comes.

4. The control device according to claim 1, wherein the intermediate code includes a function for the command value computation unit to compute the second command value at every control cycle.

5. The control device according to claim 2, wherein the intermediate code includes a function for the command value computation unit to compute the second command value at every control cycle.

6. The control device according to claim 3, wherein the intermediate code includes a function for the command value computation unit to compute the second command value at every control cycle.

7. The control device according to claim 1, wherein the interpreter sequentially queues the generated intermediate code to the buffer, and the command value computation unit reads the intermediate code in an order in which the intermediate code is queued in the buffer.

8. The control device according to claim 2, wherein the interpreter sequentially queues the generated intermediate code to the buffer, and the command value computation unit reads the intermediate code in an order in which the intermediate code is queued in the buffer.

9. The control device according to claim 3, wherein the interpreter sequentially queues the generated intermediate code to the buffer, and the command value computation unit reads the intermediate code in an order in which the intermediate code is queued in the buffer.

10. The control device according to claim 4, wherein the interpreter sequentially queues the generated intermediate code to the buffer, and the command value computation unit reads the intermediate code in an order in which the intermediate code is queued in the buffer.

11. The control device according to claim 1, wherein the intermediate code includes a function that takes time of the control cycle as an input and a command value as an output.

12. The control device according to claim 2, wherein the intermediate code includes a function that takes time of the control cycle as an input and a command value as an output.

13. The control device according to claim 3, wherein the intermediate code includes a function that takes time of the control cycle as an input and a command value as an output.

14. The control device according to claim 4, wherein the intermediate code includes a function that takes time of the control cycle as an input and a command value as an output.

15. The control device according to claim 1, comprising a plurality of sets of the interpreter and the command value computation unit.

16. The control device according to claim 1, wherein the execution processing unit, the command value computation unit, and the output unit are executed as high priority task, and the interpreter is executed as a low priority task.

17. The control device according to claim 2, wherein the execution processing unit, the command value computation unit, and the output unit are executed as high priority task, and the interpreter is executed as a low priority task.

18. The control device according to claim 3, wherein the execution processing unit, the command value computation unit, and the output unit are executed as high priority task, and the interpreter is executed as a low priority task.

19. The control device according to claim 16, wherein an execution time of the high priority task is assigned to each control cycle, and the low priority task is executed at a time other than the execution time of the high priority task.

20. The control device according to claim 16, wherein the control device has a processor having a plurality of cores, the high priority task is executed in a first core, and the low priority task is executed in a second core.

* * * * *